United States Patent [19]

Kawada et al.

[11] 4,327,315
[45] Apr. 27, 1982

[54] INDUCTION MOTOR DRIVE APPARATUS

[75] Inventors: Shigeki Kawada, Hino; Hiroshi Ishida, Hamura; Yutaka Koiwai, Tokyo, all of Japan

[73] Assignee: Fujitsu Fanuc Limited, Hino, Japan

[21] Appl. No.: 89,739

[22] Filed: Oct. 31, 1979

[30] Foreign Application Priority Data

Nov. 4, 1978 [JP] Japan ............................. 53-136069

[51] Int. Cl.³ ............................................. H02P 5/40
[52] U.S. Cl. .................................... 318/811; 318/803
[58] Field of Search ............................ 318/798-803, 318/807, 809-812

[56] References Cited

U.S. PATENT DOCUMENTS

| | | | |
|---|---|---|---|
| 3,346,794 | 10/1967 | Stemmler | 318/810 |
| 3,353,081 | 11/1967 | Stemmler | |
| 3,821,620 | 6/1974 | Lindberg | 318/799 |
| 3,878,445 | 4/1975 | Kirkham et al. | 318/800 X |
| 3,887,853 | 6/1975 | Klein et al. | 318/801 |
| 3,912,993 | 10/1975 | Bereisa, Jr. | 318/801 |
| 4,042,862 | 8/1977 | Franklin | 318/800 |
| 4,227,138 | 10/1980 | Espelage et al. | 318/802 |
| 4,247,890 | 1/1981 | Cutler et al. | 318/722 |

Primary Examiner—David Smith, Jr.
Assistant Examiner—G. Z. Rubinson
Attorney, Agent, or Firm—Staas & Halsey

[57] ABSTRACT

Disclosed is an induction motor drive apparatus which brings the actual speed of an induction motor into coincidence with a command speed by varying the frequency and effective value of a three-phase AC voltage applied to the induction motor. The apparatus includes an inverter for generating three-phase AC voltage, a speed deviation signal generator, an amplitude controller for controlling the amplitude of the speed deviation signal, an adder for adding together a voltage signal which conforms to the actual speed and the speed deviation signal which has been controlled, a rectangular waveform signal generator, and a pulse width modulator. The rectangular waveform signal generator is adapted to produce a three-phase rectangular signal whose frequency is proportional to the output voltage value of the adder. The rectangular signal of each phase is modulated in pulse width on the basis of the speed deviation, the inverter being controlled by each resulting pulse-width modulated rectangular signal to thereby vary the effective value of the three-phase AC voltage.

2 Claims, 8 Drawing Figures

INDUCTION MOTOR DRIVE APPARATUS

BACKGROUND OF THE INVENTION

The present invention relates to an induction motor drive apparatus, and more particularly to and induction motor drive apparatus that allows smooth rotation of an induction motor in a low-speed region.

The speed of three-phase induction motors are dependent upon the frequency and effective value of the three-phase AC voltages applied thereto, and therefore can be controlled by varying these two quantities. Drive systems for three-phase induction motors generally employ an inverter circuit which converts a DC voltage into a three-phase AC voltage. The frequency and effective value of this three-phase AC voltage can be made variable by controlling the on-off timing of the power transistors that constitute the inverter circuit. Accordingly, if it is desired to vary the speed of an induction motor, the effective value and/or frequency of the three-phase AC voltage acquired from the output of the inverter circuit need only be changed by suitable control of the inverter circuit. More specifically, with the induction motor operating in a high-speed region, speed is controlled by varying only the frequency of the three-phase AC voltage from the inverter circuit while holding the effective value of the three-phase AC voltage constant. This is known as variable frequency control. With the motor operating in the low speed region, speed is controlled by varying the frequency of the three-phase AC voltage and by adjusting the effective value thereof in accordance with the change in frequency. This is known as variable voltage-variable frequency control. The effective value of the voltage is not varied in the high speed region because the commercial power source voltage is already determined and because of limitations in the power transistors constituting the inverter circuit to withstand voltages.

The variable voltage-variable frequency control applied in the low speed region is an effective method of speed control since the speed of the induction motor can be regulated while holding the generated torque constant. However, torque irregularity or ripple as well as excitation noise arise when the speed of an induction motor is lowered by the variable voltage-variable frequency control method with the induction motor operating in the low speed region. This is attributable to the fact that a smooth revolving magnetic field is not generated because the three-phase AC voltage waveform on the output side of the inverter circuit is not perfectly sinusoidal but is rather an uneven stepped waveform which is only an approximation of a sinusoidal wave. In particular, an abrupt decrease in load to a small value when the motor is in the low speed region makes smooth rotation of the motor impossible and thus results in intermittent rotation because of torque irregularity, a decrease in the fly-wheel effect owing to the smaller load, and the fact that the generated torque becomes greater than the torque required for the particular load.

This torque irregularity and excitation noise can be considerably suppressed and smooth rotation made possible by making the effective value of the three-phase AC voltage smaller than a stipulated value decided on the basis of the variable voltage-variable frequency control. However, if the load increases under a condition in which the effective value of the three-phase AC voltage is smaller than the stipulated value, the induction motor will not be able to generate the required torque, and the motor will come to a stop. Hence, there is a need for an induction motor drive system that can eliminate torque irregularity and excitation noise in the low speed region and yet permit smooth rotation of an induction motor at a command speed, even under sudden changes in load.

BRIEF SUMMARY OF THE INVENTION

In brief, the present invention discloses an induction motor drive apparatus capable of preventing torque irregularity and excitation noise in a low speed region, thereby enabling the induction motor to rotate smoothly at low speeds.

It is therefore an object of the present invention to provide an induction motor drive apparatus that eliminates torque irregularity and excitation noise in a low speed region, while enabling the induction motor to be smoothly rotated even under a fluctuating load.

It is another object of the present invention to provide an induction motor drive apparatus that eliminates torque irregularity and excitation noise in a low speed region but which will not stop rotation of the induction motor even under an increase in load.

It is still another object of the present invention to automatically accelerate and decelerate the speed of an induction motor when the motor is started, as well as when it is brought to a stop, thereby enabling the induction motor to be smoothly rotated at the command speed, or allowing it to be brought smoothly to a stop.

It is yet another object of the present invention to enable smooth control of induction motor speed by making the effective value of the three-phase AC voltage impressed upon the induction motor larger or smaller than a fixed voltage value decided by VVVF control (variable voltage-variable frequency control), on the basis of the actual speed of the induction motor and the deviation in the speed thereof.

It is a further object of the present invention to provide a novel circuit for controlling both the effective value and the frequency of a three-phase AC voltage.

Other features and advantages of the invention will be apparent from the following description taken in connection with the accompanying drawings.

DESCRIPTION OF THE PREFERRED EMBODIMENT

Figure 1:
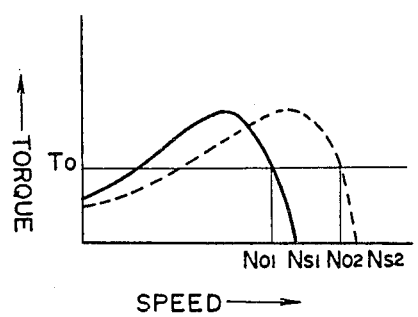
FIG. 1 is a graph useful in explaining torque-speed characteristics of an induction motor when the primary frequency is changed.
Figure 2:
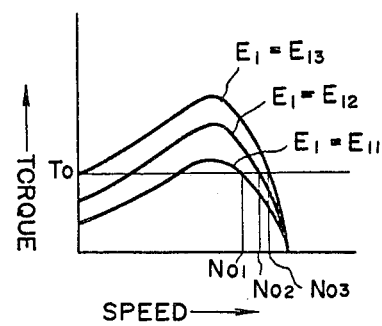
FIG. 2 is a graph useful in explaining torque-speed characteristics of an induction motor when a primary voltage applied thereto is changed.
Figure 3:
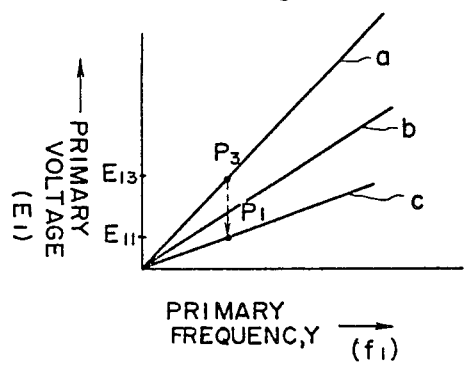
FIG. 3 is a graph useful in explaining primary voltage-primary frequency characteristics of an induction motor when controlled to vary voltage and frequency.

FIGS. 1 through 3 are graphs which are useful in explaining the theory of speed control as it relates to induction motors. Specifically, FIG. 1 shows torque-speed characteristics in a case where the primary frequency of the motor is varied, FIG. 2 the torque-speed characteristics in a case where the primary voltage of the motor is varied, and FIG. 3 the primary voltage-primary frequency characteristics when the motor is subjected to variable voltage-variable frequency (VVVF) control.

An induction motor when supplied with three-phase AC voltage gives rise to a revolving magnetic field that drives a rotor. Under no-load conditions the induction motor will rotate at a substantially synchronous speed Ns but as the load increases the speed will assume a value N to produce a torque that conforms to the load. If we let $f_1$ represent the frequency of the three-phase AC voltage (the primary voltage) applied to the motor, and P the number of poles thereof, we have the relation $$N_s = 2f_1/P \tag{1}$$

If we now make the synchronous speed of the induction motor $N_{s1}$, the torque-speed (T-S) characteristic thereof follows the curve indicated by the solid line in FIG. 1, from which it can be understood that the induction motor will rotate at a speed $N_{01}$ if connected to a load that corresponds to a torque $T_0$. If the synchronous speed is now made $N_{s2}$ by changing the frequency $f_1$ of the primary voltage (i.e., by varying the primary frequency $f_1$), the T-S characteristic shifts to that indicated by the dotted line in FIG. 1, so that the induction motor rotates at the speed $N_{02}$. In other words, the speed of the induction motor can be controlled by controlling the primary frequency $f_1$. On the other hand, holding the synchronous speed of the motor constant and varying the effective value $E_1$ of the primary voltage $e_1$ gives the curve illustrated in FIG. 2, where $E_{11}$, $E_{12}$ and $E_{13}$ are related by the inequality $E_{11} < E_{11} < E_{13}$. The graph shows that the induction motor will rotate at the speed $N_{01}$ if the effective value of the primary voltage is $E_{11}$ and the load corresponds to the torque $T_0$. Thus, the speed of the motor will gradually increase to the points $N_{02}$, $N_{03}$ if the effective value of the primary voltage is varied to assume the values $E_{12}$, $E_{13}$ with the torque remaining constant at $T_0$. More specifically, changing the effective value $E_1$ of the primary voltage enables the speed of the induction motor to be controlled.

VVVF control may be explained as follows. The primary current $I_1$ of the induction motor and the generated torque T are respectively proportional to $E_1/f_1$ and $(E_1/f_1)^2$ in a speed range wherein the primary resistance drop can be neglected. Hence, if the primary frequency $f_1$ and effective value $E_1$ of the primary voltage are varied so as to remain in the same proportion to each other, the primary current $I_1$ and the generated torque T can be held constant while enabling the speed of the induction motor to be controlled in a continuous manner. This control is called VVVF control. The relation between primary voltage $E_1$ and primary frequency $f_1$ in the case of VVVF control is shown by the straight lines in FIG. 3. Here the straight lines a, b and c represent the $E_1$-$f_1$ characteristics with the primary current $I_1$ held at three constant values $I_{11}$, $I_{12}$ and $I_{13}$, where the inequality $I_{11} < I_{12} < I_{13}$ holds. It should be noted that the torque T is proportional to the square of the primary current $I_1$, so that the straight lines a, b and c can also be considered as representing the $E_1$-$f_1$ characteristics when the torque is held constant at the values $T_{11}$, $T_{12}$ and $T_{13}$.

Figure 4A:
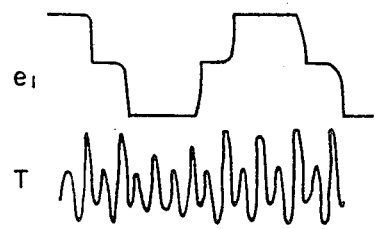
FIGS. 4A and 4B are waveform diagrams each illustrating primary voltage and torque.
Figure 4B:
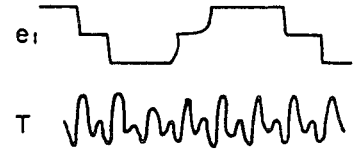

The gist of the present invention can be described as follows. If the primary voltage is nearly sinusoidal and includes a number of steps, a torque irregularity or ripple arises when the motor rotates at low speed under VVVF speed control. In particular, a sudden decrease in torque when the motor is operating in the low speed region results in rough and intermittent rotation of the motor owing to (1) the occurrence of the torque irregularity; (2) reduced fly wheel effect due to the lighter load; and (3) the generated torque being greater than the torque called for by the load. In such situations the torque irregularity can be diminished and the generated torque decreased, thereby enabling smooth rotation of the induction motor, if the primary voltage can be made smaller than the voltage value decided by the VVVF control. Thus if reference is made to FIGS. 4A and 4B showing the measured waveforms of the primary voltage $e_1$ and torque T, it can be understood that reducing the primary voltage lessens the torque irregularity. This decrease in torque irregularity and generated torque attendant upon the reduction in the primary voltage follows from the fact that the torque is proportional to the square of the primary voltage $E_1$. The foregoing will now be described in more detail with reference to FIG. 3.

It will be assumed that the operating point of the induction motor which is being subjected to a load corresponding to a torque $T_{13}$, will be located at the point $P_3$ on the straight line a of FIG. 3, and that the motor is rotating at a prescribed low speed. Under these conditions, with the torque held constant at $T_{13}$, the operating point will move along the line a and the motor speed will change if $E_1$ and $f_1$ are increased and decreased in a mutually proportional manner by means of VVVF control. If at the operating point $P_3$ the load should now suddenly attain a value of $T_{11}$ ($<T_{13}$), the motor would not be capable of rotating smoothly for the reasons described above. However, reducing the primary voltage to the value $E_{11}$ which is smaller than the voltage $E_{13}$ decided by the straight line a, causes the operating point to shift to the point $P_1$ and brings the generated torque to the value $T_{11}$, thus allowing the motor to rotate in a smooth manner. Conversely, an increase in load from $T_{11}$ to $T_{13}$, with the operating point at $P_1$, is handled by making the primary voltage greater than the voltage $E_{11}$ decided by the straight line c. This generates the prescribed torque so that the motor continues to run without interruption.

Thus, in brief, an induction motor can be made to rotate in a smooth manner if its speed is regulated by VVVF control when the applied load is constant, whereas the primary voltage is made larger or smaller than the voltage value decided by the VVVF control when the load increases or decreases.

Figure 5:
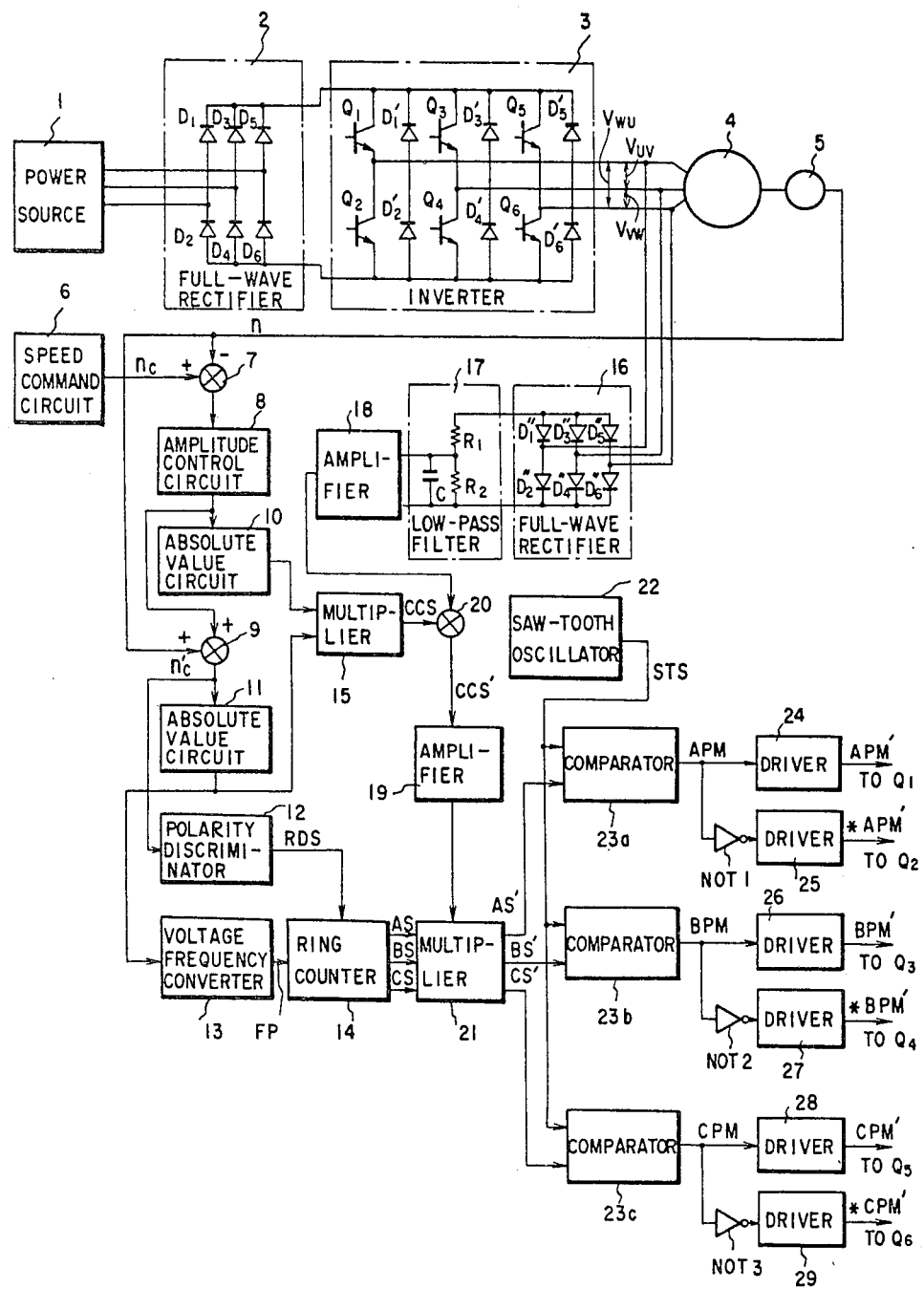
FIG. 5 is a circuit block diagram of an induction motor drive apparatus in accordance with the present invention.
Figures 6, 7:
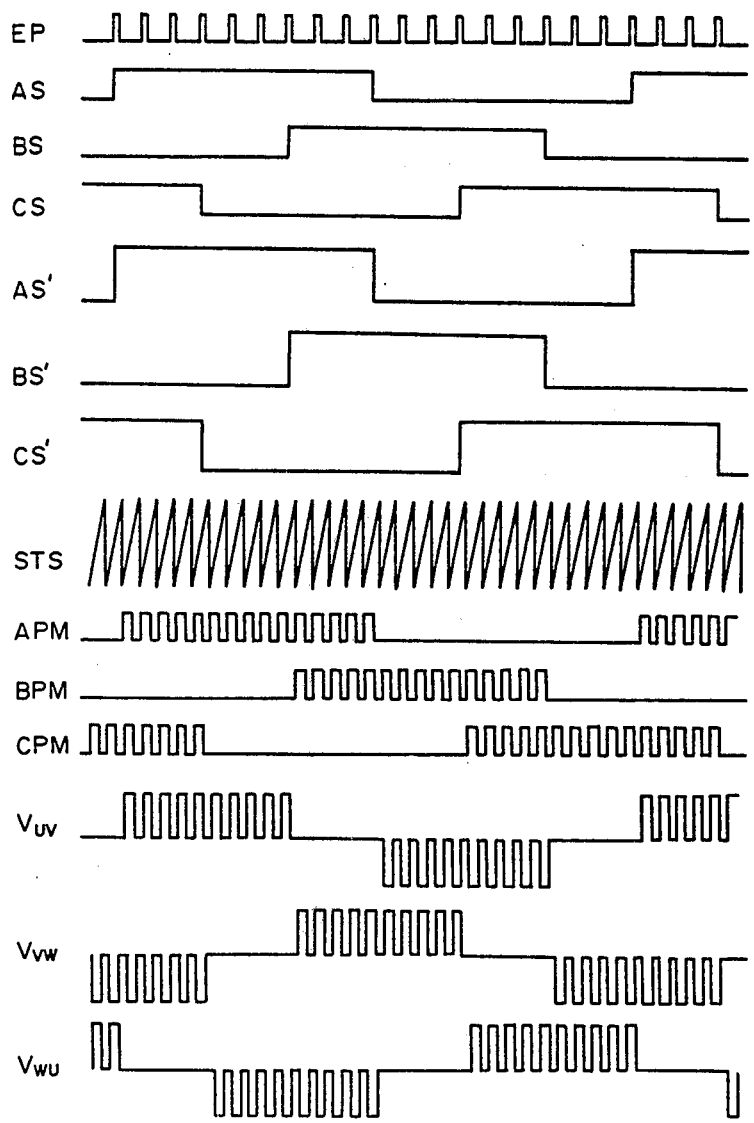
FIG. 6 is a timing chart showing each of the signal waveforms associated with the induction motor drive apparatus of FIG. 5.
FIG. 7 is a table useful in explaining the operation of a ring counter for generating a three-phase rectangular wave.

FIG. 5 is a circuit block diagram of an induction motor drive apparatus, FIG. 6 is a timing chart of the associated waveforms, and FIG. 7 is a table useful in explaining the operation of a ring counter.

Referring now to FIG. 5, a three-phase AC power source 1 supplies sinusoidal, three-phase AC power to a full-wave rectifier circuit 2 comprising diodes $D_1$ through $D_6$ and adapted to produce a DC voltage by full-wave rectifying the three-phase AC voltage. An inverter circuit 3 comprising power transistors $Q_1$ through $Q_6$ and diodes $D'_1$ through $D'_6$ receives the full-wave rectified DC voltage from full-wave rectifier 2 and converts this voltage to a three-phase AC voltage which has a stepped, nearly sinusoidal waveform whose frequency and effective value can be changed by controlling the on-off timing of the power transistors $Q_1$ through $Q_6$. A three-phase induction motor generally designated 4 has a shaft which mounts a speed detector 5 such as a tachometer generator, the latter being adapted to generate an analog voltage which is proportional to the rotational speed n of the motor. A speed command circuit 6 supplies to an analog adder 7 an analog voltage which is proportional to a command speed $n_c$, the adder 7 producing an output voltage which is proportional to a speed deviation $(n_c - n)$ between the command speed $n_c$ and the actual speed n. It should be noted that "slip" s is defined as a variable that represents the speed deviation of the induction motor, and that it is obtained by the following equation $$s = (n_s - n)/n_s \qquad (2)$$

where $n_s$ is the synchronous speed of the motor and n the actual speed thereof. Thus if the command speed $n_c$ obtained from the speed command circuit 6 is considered to be the synchronous speed $n_s$, the output voltage of the analog adder 7 can be considered as being proportional to the slip s.

An amplitude control circuit 8 comprises an error amplifier having a primary delay characteristic or a limiter circuit. If the control circuit 8 is an error amplifier it will produce a deviation signal that will vary exponentially, but, if a limiter, will produce an output clipped at a fixed value at such time that the speed deviation, namely the slip, exceeds a prescribed value. For example, the amplitude control circuit 8 will pass the value $(n_c - n)$ if slip s is less than the fixed value, but its output will be $k(n_c - n)$ if s exceeds the fixed value, where $k < 1$.

An analog adder 9 is adapted to add the actual speed n and the output of the amplitude control circuit 8. The output $n'_c$ of the adder 9 is equivalent to the command speed $n_c$ when the speed deviation is small, but assumes the value $(n + k(n_c - n))$ when the speed deviation is large. An absolute value circuit 10 produces an output which is the absolute value of the speed deviation $(n_s - n)$, and an absolute value circuit 11 produces an output which is the absolute value of the speed signal $n'_c$ acquired from the analog adder 9. Designated at 12 is a polarity discriminator circuit. A voltage-frequency converter 13 produces a pulse train FP whose frequency is proportional to the output voltage $|n'_c|$ delivered by the absolute value circuit 11. A ring counter 14 has three flip-flop stages which produce three-phase rectangular signals AS, BS and CS successively displaced in phase by $2\pi/3$. More specifically, if the set outputs of the respective flip-flops are designated $F_1$, $F_2$ and $F_3$, the state of the $F_1$ to $F_3$ outputs will change as shown in FIG. 7 every time a signal pulse FP is generated by the voltage-frequency converter 13. Accordingly, if the set outputs $F_1$, $F_2$, $F_3$ of the respective flip-flops are delivered in the mentioned order, the three-phase rectangular signals AS, BS and CS will be produced successively displaced in phase by $2\pi/3$. The direction in which each of the flip-flops undergoes a change in state is shown by the arrow A in FIG. 7 if the induction motor 4 is rotating in the forward direction, that is, if the output of polarity discriminator 12 is at logic "1", and by the arrow B if the motor is rotating in the reverse direction. In other words, the direction of phase rotation of the three-phase rectangular signals AS, BS, CS is determined by the output of the polarity discriminator circuit 12.

An analog multiplier 15 multiplies the speed deviation $|n_c - n|$ by the output $|n'_c|$ of the absolute value circuit 11 and in response produces an output voltage $|n'_c(n_c - n)|$ which conforms to the speed deviation and the speed signal $n'_c$. A full-wave rectifier 16 comprising diodes $D_1''$ through $D_6''$ full-wave rectifies the three-phase AC voltage obtained from the inverter 3. A low-pass filter 17 comprising resistors $R_1$, $R_2$ and a capacitor C is adapted to level the ripple contained in the DC voltage as rectified and delivered by the full-wave rectifier 16. An adder 20 is adapted to add the output of multiplier 15 and the output from an amplifier 18. An analog multiplier 21 is adapted to multiply the rectangular wave signals AS, BS, CS by the output of an amplifier 19 and in response produce three-phase rectangular wave signals AS', BS', CS' whose amplitudes conform to the speed deviation $(n_s - n)$ and speed signal $n'_c$.

A saw-tooth oscillator circuit 22 produces a saw-tooth signal STS having a period which is considerably shorter than that of the three-phase rectangular signals AS', BS', CS'. Comparators 23a, 23b, 23c compare the amplitude of the saw-tooth signal STS with those of the three-phase rectangular signals AS', BS', CS' and each produces an output at logic "1" if the amplitude of its AS', BS' or CS' input is the greater. In other words, the saw-tooth oscillator circuit 22, multiplier 21 and comparators 23a, 23b, 23c construct a pulse width modulator circuit which is adapted to provide phase control signals APM, BPM, CPM which consist of the respective rectangular signals AS', BS', CS' after they have been modulated in pulse width in accordance with their amplitudes. NOT gates are designated at $NOT_1$ through $NOT_3$ and driver circuits at 24 through 29, the latter supplying their outputs to the respective bases of the power transistors $Q_1$ through $Q_6$ that construct the inverter circuit 3.

A description of the operation of the system shown in FIG. 5 will now follow with reference being had to the timing chart of FIG. 6.

(a) The first case considered shall be one in which the induction motor is rotating in the forward direction with a command speed $n_c$ and a prescribed speed deviation.

If the induction motor 4 is rotating under the condition described, a change in load will give rise to a change in the actual speed n of the motor, the latter conforming to the increase or decrease in the load. Let us now assume that the load increases, giving rise to a drop in the actual speed n. The actual motor speed n is detected by the tachometer generator 5 which produces an output voltage proportional thereto. The adder 7 operates on the speed command signal $n_c$ being provided by the speed command circuit 6 and the actual motor speed n supplied by the tachometer generator to produce an output signal representative of the difference $n_c - n$. This signal is supplied to amplitude control circuit 8 where its amplitude is controlled. If the amplitude control circuit comprises a limiter its output will be the speed deviation $(n_c - n)$ if the speed deviation is small; however, if the speed deviation is large, the limiter circuit output will be $k(n_c - n)$, where $k < 1$. The output is added to the actual speed n in the adder 9 whose output, namely the speed signal $n'_c$, will be equivalent to the command speed $n_c$ if the limiter output is $(n_c-n)$, or to the value $(n+k(n_c-n))$ if the limiter output is $k(n_c-n)$. The value $(n-k(n_c-n))$ is obtained by adding the prescribed quantity $k(n_c-n)$ to the actual speed n, and functions to gradually increase or decrease the actual speed of the induction motor 4, when the speed deviation is large, until the actual speed attains the command speed $n_c$. Here the output of adder 9 is assumed to be $n_c$.

The command speed $n_c$ is applied to the absolute value circuit 11 and the polarity discriminator circuit 12 which act upon the signal to divide into an absolute value signal $|n_c|$ and a rotational direction signal RDS. The absolute value signal $|n_c|$ is applied to the voltage-frequency converter 13 which converts the signal into a pulse train FP whose frequency is proportional thereto. The ring counter 14 receives the rotational direction signal RDS being supplied by the polarity discriminator 12 and the pulse train FP being provided by voltage-frequency converter 13, and in response thereto produces the three-phase rectangular voltage signals AS, BS, CS which, in addition to having a fixed peak value, are proportional in frequency to the command signal $n_c$ and exhibit the prescribed phase rotation directions as described above. The signals AS, BS, CS are in turn delivered to multiplier 21.

Meanwhile the speed deviation $n_c-n$ delivered by the amplitude control circuit 8 is being converted into an absolute value signal by the absolute value circuit 10. This signal, namely $|n_c-n|$, together with the absolute value signal $|n_c|$ from the absolute value circuit 11, is used to produce a control signal for effecting variable voltage-variable frequency (VVVF) control. To this end, the signals $|n_c-n|$ and $|n_c|$ are multiplied together in the analog multiplier 15 which produces a control signal CCS whose magnitude is the product $|n_c-n|\cdot|n_c|$ supplied by multiplier 15. With the induction motor 4 continuing to rotate under the command speed $n_c$ and the prescribed speed deviation, a heavier load will enlarge the speed deviation and therefore increase the amplitude of the control signal CCS.

In parallel with the foregoing circuit operation, the three-phase AC voltages $V_{UV}$, $V_{VW}$, $V_{WU}$ from the inverter circuit 3 are being full-wave rectified by the full-wave rectifier 16. Low-pass filter 17 levels the ripple contrained in the DC voltage provided by the full-wave rectification and produces an output voltage which is proportional to the total error resulting from voltage fluctuation in the three-phase power source 1 as well as error in the phase control system that drives the inverter 3. The adder 20 operates on the control signal CCS and the DC voltage provided by the low-pass filter 17 and calculates their difference. In other words, the control signal CCS is corrected in accordance with the error which results from voltage fluctuation and the error in the phase control system. The corrected control signal, now known as CCS', is applied to the analog multiplier 21 via the amplifier 19 which, since it is receiving the three-phase rectangular signals AS, BS, CS, multiplies the signals AS, BS, CS by the control signal CCS' to produce three-phase rectangular signals AS', BS', CS' which conform in amplitude to the speed deviation signal $|n_c-n|$ and command speed $|n_c|$ and which are proportional in frequency to the command speed $n_c$.

The comparators 23a, 23b, 23c compare the peak values of the respective rectangular signals AS', BS', CS' with the amplitude of the saw-tooth wave STS being provided by the saw-tooth oscillator 22, and each comparator is adapted to produce a logic "1" output if the amplitude of its AS', BS' or CS' input is greater than the saw-tooth amplitude. In this manner the comparators 23a, 23b, 23c produce the phase control signals APM, BPM, CPM of three phases, the signals being modulated in pulse width in accordance with the amplitude of each rectangular wave signal AS', BS', CS'. Here it should be noted that the effective voltage value of each phase control signal APM, BPM, CPM is proportional to the speed deviation $|n_c-n|$ and the command speed $|n_c|$ because the amplitude of each of the rectangular signals AS', BS', CS' is proportional to $|n_c-n|$ and $|n_c|$. In addition, the frequency of each of the phase control signals APM, BPM, CPM is proportional to the command speed $n_c$ from the fact that the frequency of the signals AS', BS', CS' is proportional thereto.

The NOT gates $NOT_1$ through $NOT_3$ and driver circuits 24 through 29 use the phase control signals APM, BPM, CPM to produce drive signals APM', *APM', BPM', *BPM', CPM', *CPM' for controlling the on-off operation of the power transistors $Q_1$ through $Q_6$ in inverter circuit 3. These drive signals drive the power transistors $Q_1$ through $Q_6$ in a sequential manner so that the inverter circuit 3 will produce the stepped AC voltages $V_{UV}$, $V_{VW}$, $V_{WU}$ which have been modulated in pulse width. These three-phase voltages $V_{UV}$, $V_{VW}$, $V_{WU}$ are applied as primary voltage to the induction motor 4 and serve to control its speed. At this time the effective value $E_1$ of the three-phase voltages $V_{UV}$, $V_{VW}$, $V_{WU}$ is proportional to both the speed deviation $|n_c-n|$ and command speed $|n_c|$, and the primary frequency $f_1$ thereof is proportional to the command speed $|n_c|$. Accordingly, if the speed deviation is constant, the effective value $E_1$ of the primary voltage and the primary frequency $f_1$ will be proportional to each other. The speed of induction motor 4 will therefore be regulated in accordance with VVVF control.

The operation described above is repeated until the speed deviation between the actual speed n and the command speed $n_c$ attains the prescribed speed deviation value. Moreover, it should be particularly noted that the effective value of the three-phase AC voltages $V_{UV}$, $V_{VW}$, $V_{WU}$ is dependent upon the speed deviation $|n_c-n|$. In addition, the speed deviation is approximately proportional to the degree of load fluctuation. Hence, if the actual speed drops, i.e., the speed deviation $|n_c-n|$ increases, owing to an increase in load, the effective value $E_1$ of primary voltage $V_{UV}$, $V_{VU}$, $V_{WU}$ becomes larger than the value decided by the VVVF control, whereby the generated torque is increased. On the other hand, if the actual speed rises, or the speed deviation $|n_c-c|$ decreases, owing to a decrease in the load, the effective value $E_1$ of primary voltage $V_{UV}$, $V_{VU}$, $V_{WU}$ becomes smaller than the value decided by VVVF control, whereby the generated torque is decreased.

(b) The next case considered shall be one in which the induction motor is rotating in the forward direction at a command speed, at which time the load connected to the motor is suddenly changed by a wide margin.

An abrupt change in load enlarges the speed deviation $(n_c-n)$, with the result that the output of the amplitude control amplifier 8, namely the limiter circuit or error amplifier, becomes $k(n_c-n)$, where $k<1$, the output n'c $(=n_1)$ of adder 9 thus becoming $(n+k(n_c-n))$. The adder output $n_1$ establishes a speed smaller by $|k(n_c-n)|$ than the actual speed n at such time that the actual speed n has increased owing to a decrease in load, and establishes a speed larger by $|k(n_c-n)|$ than the actual speed n at such time that n has decreased owing to an increase in load. Thereafter, speed control is performed in the same manner as described above. In accordance therewith, both the frequency $f_1$ and effective value $E_1$ of the primary voltage are increased or decreased depending upon the increase or decrease in the load, with the result that the speed of induction motor 4 is regulated so as to attain the value $n_1$. The output $n'_c(=n_2>n_1)$ of adder 9 then attains the value $(n_1+k(n_c-n_1))$, after which the speed control of the induction motor is carried out as described above to thereby regulate the speed to $n_2$. The speed of the induction motor continues to be changed in the above manner so as to attain the values $n_2 \rightarrow n_3 \rightarrow n_4$ - - - , until a motor speed having the command speed $n_c$ and the prescribed speed deviation is finally obtained.

In short, if an enlarged speed deviation occurs due to a large scale, abrupt change in load, the apparatus described above effects a control operation so as to gradually increase or decrease the primary frequency $f_1$ of the primary voltage and at the same time make the effective value $E_1$ of the primary voltage larger or smaller than the voltage value decided by VVVF control, whereby the speed deviation between the actual speed n and command speed $n_c$ is made to agree with the prescribed speed deviation.

(c) The final case considered will be speed adjustment when starting and stopping the induction motor.

When starting and stopping the motor, the speed deviation $|n_c-n|$ is nerely equal to the command speed $n_c$ and, it is large so that motor speed is adjusted in exactly the same manner as in the situation where the load undergoes a large and abrupt change.

In accordance with the present invention as described above, an induction motor operating under variable voltage-variable frequency control can be rotated in a smooth manner even if there is a shift to a lighter load. This is possible because the generated torque and torque ripple at the time of the lighter load are minimized due to the fact that the effective value $E_1$ of the primary voltage becomes smaller than the voltage value decided by the VVVF control. On the other hand, a large speed deviation resulting from a heavy load is accompanied by an increase in the effective value $E_1$ of the primary voltage, this value becoming larger than the voltage value decided by the VVVF control. This immediately leads to the generation of a large torque which allows the induction motor to continue rotating without interruption.

What we claim is:

1. An induction motor drive apparatus which includes an inverter for converting DC voltage into three-phase AC voltage, an induction motor driven by the three-phase AC voltage, speed command means for instructing that the induction motor rotates at a command speed, means for detecting the actual speed of the induction motor, deviation signal generating means for generating a speed deviation signal based on the deviation between the command speed and the actual speed of the induction motor, first amplitude control means for controlling the amplitude of the speed deviation signal, adding means for adding the output of said amplitude control means to the actual speed of the induction motor, means for controlling the effective value and the frequency of the three-phase AC voltage applied to the induction motor, on the basis of the output of the adding means, the actual speed of the induction motor being made to coincide with the command speed by controlling the frequency and effective value of the three-phase AC voltage, said means for controlling the effective value and the frequency of the three-phase AC voltage comprising; rectangular wave signal generating means for producing three-phase rectangular wave signals of a frequency in accordance with the output value of said adding means; pulse width modulating means for modulating the pulse width of the rectangular wave signal of each of the three phases; second amplitude control means for controlling the amplitude of the rectangular wave signal of each of the three phases, on the basis of the speed deviation signal and the output signal of said adding means, the amplitude-controlled rectangular wave signals being modulated in pulse width by said pulse width modulating means to provide pulse-width modulated signals, said inverter being controlled on the basis of said pulse-width modulated signals thereby to control the effective value and the frequency of the three-phase AC voltage, said second amplitude control means includes first multiplying means for multiplying together the speed deviation signal and the output of the adding means, the amplitude of the rectangular wave signals being controlled on the basis of the output of said first multiplying means, and the amplitude-controlled rectangular wave signals being modulated in pulse width by said pulse width modulating means, and said second amplitude control means further including second multiplying means for multiplying the three-phase rectangular wave signal by the output of said first multiplying means to control the amplitude of the three-phase rectangular wave signal.

2. An induction motor drive apparatus which includes an inverter for converting DC voltage into three-phase AC voltage, an induction motor driven by the three-phase AC voltage, speed command means for instructing that the induction motor rotates at a command speed, means for detecting the actual speed of the induction motor, deviation signal generating means for generating a speed deviation signal based on the deviation between the command speed and the actual speed of the induction motor, first amplitude control means for controlling the amplitude of the speed deviation signal, adding means for adding the output of said amplitude control means to the actual speed of the induction motor, rectangular wave signal generating means for producing three-phase rectangular wave signals of a frequency in accordance with the output value of said adding means second amplitude control means for controlling the amplitude of the rectangular wave signal of each of the three phases, on the basis of the speed deviation signal and the output signal of said adding means and pulse width modulating means for modulating the pulse width of the output of the second amplitude control means in accordance with the amplitude thereof to provide pulse-width modulated signals which control the inverter; wherein said second amplitude control means comprises first multiplying means for multiplying together the speed deviation signal and the output of the adding means, and second multiplying means for multiplying the three-phase rectangular wave signal by the output of said first multiplying means to control the amplitude of the three-phase rectangular wave signal.

* * * * *

UNITED STATES PATENT AND TRADEMARK OFFICE
CERTIFICATE OF CORRECTION

PATENT NO. : 4,327,315
DATED : April 27, 1982
INVENTOR(S) : Kawada et al

It is certified that error appears in the above—identified patent and that said Letters Patent is hereby corrected as shown below:

FRONT page, [56] References Cited, "3,353,081 11/1967 Stremmler" s/b --3,353,081 11/1967 Stremmler ...... 318/807--.

Column 1, line 6, "and" (second occurrence) s/b --an--.

Column 7, line 3, "n-k" s/b --n & k--.

Signed and Sealed this

Twelfth Day of October 1982

[SEAL]

Attest:

GERALD J. MOSSINGHOFF

Attesting Officer

Commissioner of Patents and Trademarks